United States Patent
Gampp et al.

[19]

[11] Patent Number: 6,128,424
[45] Date of Patent: Oct. 3, 2000

[54] DUAL PURPOSE INPUT ELECTRODE STRUCTURE FOR MIOCS (MULTI-FUNCTION INTEGRATED OPTICS CHIPS)

[75] Inventors: Lorrie L. Gampp, Reseda, Calif.; Gregory A. Zimmerman, Layton, Utah; Christine E. Geosling, Calabasas; John P. Rahn, West Hills, both of Calif.

[73] Assignee: Litton Systems Inc., Woodland Hills, Calif.

[21] Appl. No.: 09/124,457

[22] Filed: Jul. 28, 1998

Related U.S. Application Data

[60] Provisional application No. 60/080,260, Mar. 31, 1998.

[51] Int. Cl.[7] .................................................. G02B 6/12
[52] U.S. Cl. ................................................ 385/14; 385/44
[58] Field of Search ........................... 385/39–45, 50–51, 385/1–3, 11, 14

[56] References Cited

U.S. PATENT DOCUMENTS

| | | | |
|---|---|---|---|
| 5,153,930 | 10/1992 | DuPuy et al. | 385/8 |
| 5,189,713 | 2/1993 | Shaw | 385/2 |
| 5,388,170 | 2/1995 | Heismann et al. | 385/4 |
| 5,400,416 | 3/1995 | Enokihara et al. | 385/2 |
| 5,661,830 | 8/1997 | Nishimoto | 385/40 |
| 5,712,935 | 1/1998 | Miyakawa | 385/22 |
| 5,757,990 | 5/1998 | Miyakawa | 385/16 |
| 5,953,466 | 9/1999 | Kubota et al. | 385/2 |

OTHER PUBLICATIONS

A. Savage, Pyroelectricity and Spontaneous Polarization in LiNbO3 Jul. 1966, pp. 3071, 3072.

Naoki Mitsugi et al, Activation Energy for Dc–drift in X–cut LiNbO3 Optical Intensity Modulators, Eng. & Lab. Notes in Opt. & Phot. News, Page numbers unknown, Date of publication unknown, but believed to be post 1995 based on references cited on p. 3.

C. H. Blumer and W. K. Burnes, Pyroelectric effects in LiNbO3 channel–waveguide devices, Apr. 1986, Applied Physics Letters, vol. 48, No. 16, pp. 1036–1038.

*Primary Examiner*—John D. Lee
*Assistant Examiner*—Michelle R. Connelly-Cushwa
*Attorney, Agent, or Firm*—James F. Kirk

[57] ABSTRACT

An Integrated Optics Chip with improved performance when exposed to rapidly changing temperature is disclosed. The optic chip or integrated optic chip or MIOC has a top surface, a +Z face and −Z face. The chip is formed from a crystal having a high electro-optic coefficient such as Lithium Niobate. For the purpose of orienting the components to the optic chip to be described, the +Z crystal axis extends outward from the +Z face. An input waveguide formed in the top surface of the chip and orthogonal to the +Z axis receives an optical signal from an input port, passes the signal via a waveguide network, to an output waveguide coupling the waveguide network to an output port. Metallization is applied to the top face of the optic chip to form at least a first and a second rail. The first and second rails are positioned to very closely straddle a portion of the input waveguide. A conductive bridge connects the first and second rails to prevent a charge differential from developing between the first and second rails.

20 Claims, 4 Drawing Sheets

DUAL PURPOSE INPUT ELECTRODE STRUCTURE FOR MIOCS (MULTI-FUNCTION INTEGRATED OPTICS CHIPS)

This application is based upon the provisional application Ser. No. 60/080,260, filed Mar. 31, 1998.

BACKGROUND OF THE INVENTION

Field of Invention

The invention relates to the field of integrated optics chips or devices and more particularly to the field of multifunction integrated optics chips such as those having integrated optic circuits formed on Lithium Niobiate ($LiNbO_3$) substrates. Integrated optics chips are designed to include waveguides and to perform functions such as "Y", "Y—Y", or Star splitters, or couplers, polarizer, WDM (Wavelength Division Multiplexer) and modulators. Multiple functions are incorporated on a single device eliminating losses and errors associated with individual interface optical coupling.

The devices are fabricated in large numbers usually on three to four inch circular wafers of Lithium Niobiate ($LiNbO_3$) using conventional photomasks, vacuum deposition, chemical baths and etching techniques to form large numbers of identical components at low cost and with high reliability. MIOC's (Multifunction Integrated Optics Chips or Circuits or Components) capable of performing many of the aforementioned functions are necessary for the fabrication of middle and high accuracy FOG's (fiber optic gyros) or rotation sensors that rely on the principle of Sagnac interferometers and possibly other interferometric fiber optic sensors such as hydrophones that rely on the principles of the Mach-Zehnder or Michaelson Interferometers requiring high stability.

While performing ramped temperature environmental tests, FOG Instruments, that were exhibiting excessive power hysteresis, exhibited improved power hysteresis performance when the input modulation test rails or plates that were positioned on the surface of the MIOC to straddle the input waveguide were shorted together. Test rails or plates had been formed for use as a birefringence modulator, on MIOC devices, to facilitate testing for PNR (polarization non-reciprocity) when devices were operated in a FOG instrument. The test required that the rails function as modulator plates along the input waveguide. The plates were therefore isolated from each other so that they could be driven by a switching waveform in the course of the PNR test.

The device was made of Lithium Niobiate ($LiNbO_3$) and was similar in size to the dimensioned related art device shown in FIG. 1.

The hysteresis problem exhibits itself as a slight change in the power of a device as the device is first taken through a positive or negative temperature change followed by a negative or positive temperature change. The charge differential that develops across the face of the chip results in a charge leakage across the face of the chip. The time and temperature dependent effects combine to contribute to hysteresis in the transmitted power of the device and to the efficiency of the waveguides in the device to propagate light.

As further background, Integrated optics chips, such as those characterized in this application are formed using processes and steps similar to some of those found in related U.S. Patents such as U.S. Pat. No. 5,037,205 filed Sep. 25, 1989 for a "INTEGRATED OPTIC INTERFEROMETRIC FIBER GYROSCOPE MODULE AND METHOD" which issued to George A. Pavlath on Aug. 6, 1991 which shows a birefringence modulator comprising two electrodes formed on opposite sides of the waveguide; U.S. Pat. No. 5,193,136 filed Nov. 26, 1991 for a "PROCESS FOR MAKING MULTIFUNCTION INTEGRATED OPTICS CHIPS HAVING HIGH ELECTRO-OPTIC COEFFICIENTS" which issued to Dr. Chin L. Chang et al on Mar. 9, 1993; U.S. Pat. No. 5,046,808 filed Dec. 18, 1989 for an "INTEGRATED OPTICS CHIP AND METHOD OF CONNECTING OPTICAL FIBER THERETO" which issued to Dr. Chin L. Chang On Sep. 10, 1991; U.S. Pat. No. 5,393,371 filed Jun. 21, 1993; for a "INTEGRATED OPTICS CHIPS AND LASER ABLATION METHODS FOR ATTACHMENT OF OPTICAL FIBERS THERETO FOR $LiNbO_3$ SUBSTRATES" which issued to Dr. Chin L. Chang et al on Feb. 28, 1995; U.S. Pat. No. 5,442,719 for an "ELECTRO-OPTIC WAVEGUIDES AND PHASE MODULATORS AND METHODS FOR MAKING THEM" which issued to Dr. Chin L. Chang et al on Aug. 15, 1995.

U.S. Pat. No. 4,976,506, filed Feb. 13, 1989 for "METHODS FOR RUGGED ATTACHMENT OF FIBERS TO INTEGRATED OPTICS CHIPS AND PRODUCT THERE OF" which issued to Dr. G. Pavlath on Dec. 11, 1990 and U.S. Pat. No. 5,146,522, filed Jun. 18, 1991 for "METHODS FOR RUGGED ATTACHMENT OF FIBERS TO INTEGRATED OPTICS CHIPS AND PRODUCT THERE OF" which issued to Dr. G. Pavlath on Sep. 8, 1992 teach known methods for attaching pigtail fibers such as fiber 39, 29, 35 to respective optical ports 20, 28 and 34. The "522" patent teaches a "first plate attached to a first surface of the chip". Each of the foregoing patents have a common assignee, Litton Systems Inc. of Woodland Hills, Calif. Each of the foregoing patents cited herein are incorporated herein by reference for the purpose of providing those skilled in the art with background information on how integrated optics chips or multifunction integrated optics circuits are made.

In addition to the above patents, an early paper was titled "Short-and Long-term Stability In Proton Exchanged Lithium Niobiate Waveguides" by Janet Lehr Jackel and Catherine E. Rice of AT&T Bell Laboratories, Holmdel, N.J., 07733 appeared in SPIE Vol 460, Processing of Guided Wave Optoelectronic Materials (1984) at page 43 is of interest.

This application is particularly directed to methods and apparatus for the reduction of errors produced in an integrated optics chip formed to function as an optical modulator as a result of temperature differences across the surface of chip due to the Pyroelectric Effect or due to rapid changes in the temperature of the chip. A second application having U.S. Ser. No. 09/123,955, to formalize provisional application Ser. No. 60/080,260, filed Mar. 31, 1998 for a "Low Cost High Reliability Method of Correcting Pyroelectric Errors In Integrated Optics Chips" by Ken Shafer et al (now U.S. Pat. No. 5,044,184). Ser. No. 09/123,955 issued into U.S. Pat. No. 6,044,184 on Mar. 28, 2000 having a common assignee is incorporated herein by reference in its entirety.

SUMMARY OF INVENTION

This invention teaches an Integrated Optics Chip formed on Lithium Niobiate, a crystal substrate having a high electro-optic coefficient and conventional X, Y and a Z crystal axes. The substrate or chip has a top surface, a +Z face and a −Z face. An input waveguide is coupled to receive an optical signal from an input port. The waveguide couples that signal to a waveguide network.

At least a first and a second rail are formed on the top surface of the optic chip. The first and second rails are positioned to closely straddle a portion of the input waveguide. A conductive bridge connects the first and second rails to form a conductive network and to prevent a charge differential from developing between the first and second rails.

In a first preferred embodiment, the network formed by the combination of the rails and the conductive bridge are floating. They are not referenced to a system potential. The conductive bridge is further characterized as capable of being interrupted to permit an external drive circuit to drive the first and second rails to different potentials as might be necessary for analysis or diagnostic purposes or for calibration of the component. If desired, in an alternative embodiment, the rails can be driven to the same potential such as a system reference voltage.

DESCRIPTION OF THE PREFERRED EMBODIMENT

Figure 1:
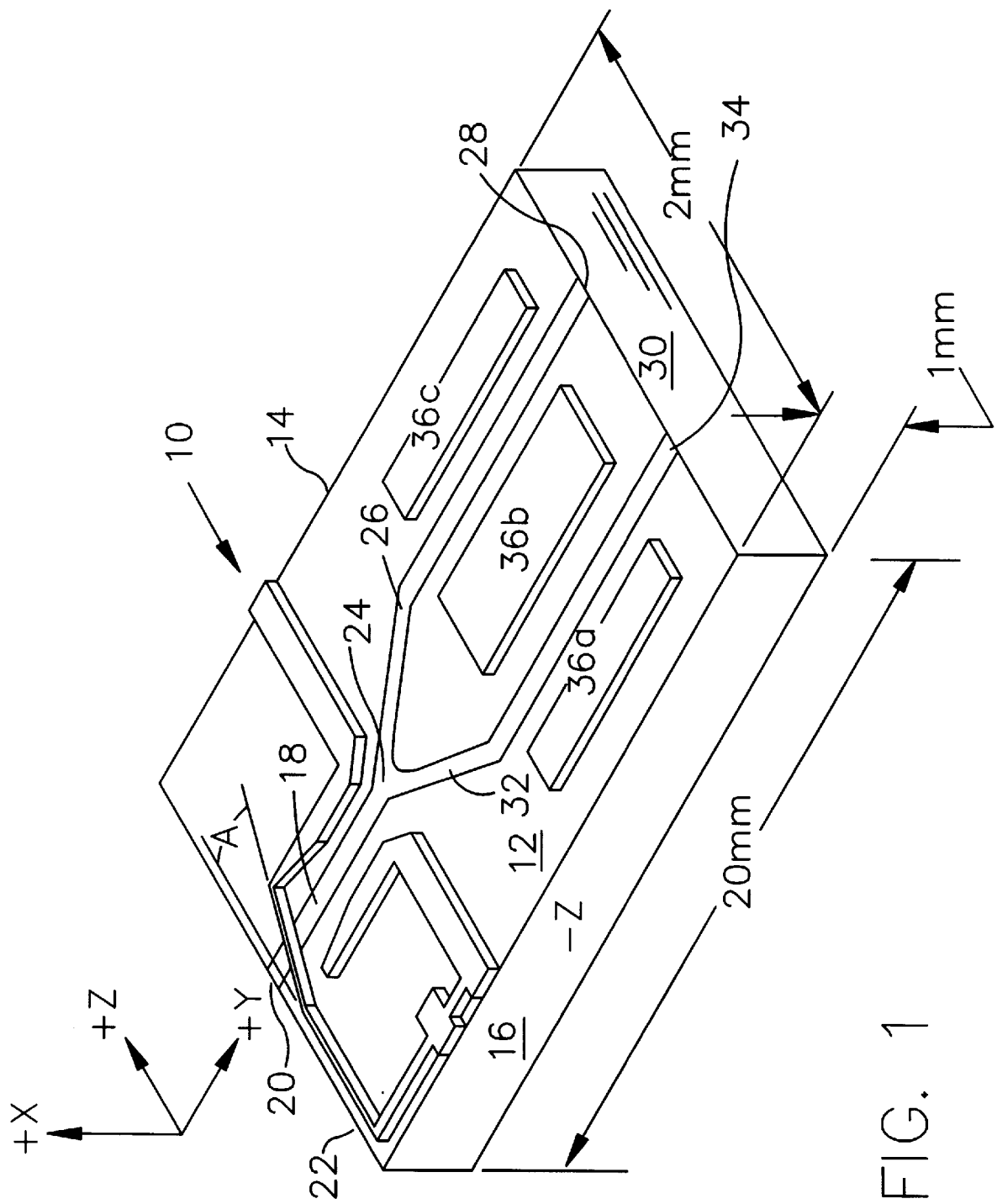
FIG. 1 is a schematic perspective view of a "Y-Coupler and Modulator" MIOC showing typical device dimensions.

FIG. 1 provides a schematic perspective view representation of an optics chip 10 having a top surface 12, a +Z face 14 and a −Z face 16 on the opposing side. The chip 10 is formed from a crystal having a high electro-optic coefficient, such as Lithium Niobiate ($LiNbO_3$). The crystal axes are illustrated showing the +Z crystal axis extending outward, normal to the +Z face, the +X axis extending upward, normal to the top surface 12 and the +Y axis extending to the right along the longitudinal axis of the optics chip 10. It should be understood that the orientation of the X-Y axes of crystal can be any crystal orientation mutually orthogonal to the +Z or −Z axis so long as the +Z or −Z axis extend outward through the +Z face 14 or the −Z face 16 of the chip and is normal to the input waveguide 18 formed in the top surface of the chip 12. A dimension of 20 mm along the Y axis, a width of 2 mm along the Z axis, and a thickness of 1 mm are illustrative and are only provided to show what the size might be of a typical optical chip 10.

The optical chip 10 of FIG. 1 is a MIOC that provides several functions. The input waveguide 18 functions as a polarizer. The "Y" junction 24 functions as a single 50/50 splitter. A first output waveguide 26 is coupled from the "Y" splitter 24 to a first output port 28 and then to a first output pigtail 29 on output face 30.

A second output waveguide 32 is coupled from the splitter 24 to a second output port 34 and then to a second output pigtail 35 on output face 30. A modulator is formed by modulator plates 36a, 36b and 36c driven by electrical drive signals from modulator drive pads 37a, 37b, and 37c respectively.

The MIOC 10 thus formed is of a type that might be used in a conventional fiber optic gyro. Input waveguide 18 receives light from input port 20 on input face 22. The input waveguide branches at the "Y" junction 24 to a first output waveguide 26 that is coupled to a first output port 28 on output face 30 and a second output waveguide 32 coupled to a second output port 34 also on the output face 30.

The input waveguide 18 and output waveguides 26, 32 comprise a waveguide network that functions as a polarizer. Polarization of the light into the TE mode is achieved by the proton-exchanged waveguide input waveguide 18 because a proton-exchanged waveguide presents a negative Δn or change in the waveguide's index of refraction to the TM component (the vertically polarized component) of the optical signal passing through the waveguide. In addition, the waveguide presents a positive Δn or change in the waveguide's index of refraction to a TE component (the horizontally polarized component) of the optical signal passing through the waveguide. The TE mode component of the signal is therefore preserved while the TM component is dissipated in the chip.

The topology forms a "Y" splitter in combination with a phase modulator having modulator plates 36a, 36b and 36c. The output waveguides 26, 32 function to guide light with phase modulation and to couple the waveguide network to output ports 28, 34.

Figure 2:
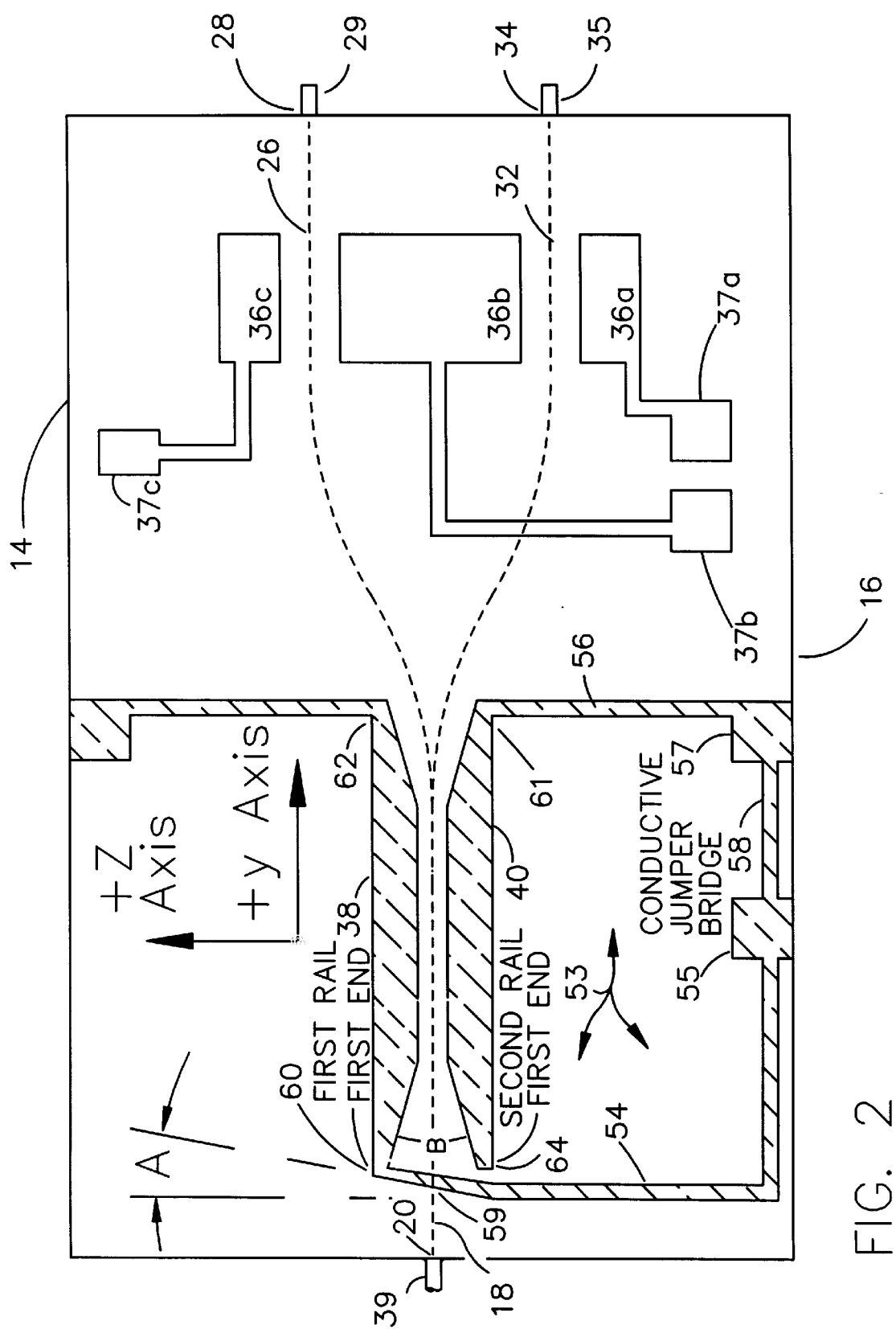
FIG. 2 is a schematic top view of a "Y-Coupler and Modulator" MIOC showing the input waveguide modulator rails with an exaggerated tapered entrance and exit, and bonding pads shown as extending to the edge of the chip; however, the bonding pads 55, 57 may or may not extend to the sides of the optics chip for connection to the +Z face 14 or −Z face 16.

FIG. 2, is a schematic top view of the optics chip 10 viewing the top surface 12. The orientation of the +Z axis is substantially orthogonal to the input waveguide 18.

Input waveguide 18 is coupled to receive an optical signal (not shown) from an input port 20 via fiber optic pigtail 39. The input waveguide 18 couples the optical signal to a waveguide network, which in the example of FIG. 2 comprises a "Y" splitter 24 formed by the bifurcation of the input waveguide 18 into the first and second output waveguides 26, 32 respectively and the modulator electrodes or modulator plates 36a–36c and their associated drive circuitry and pads 37a, 37b and 37c.

FIG. 2 shows the first and second rails 38, 40 positioned on the top surface of the optic chip. The rails straddle a portion of the input waveguide 18 and are formed on the top surface 12 from metal.

Figure 3:
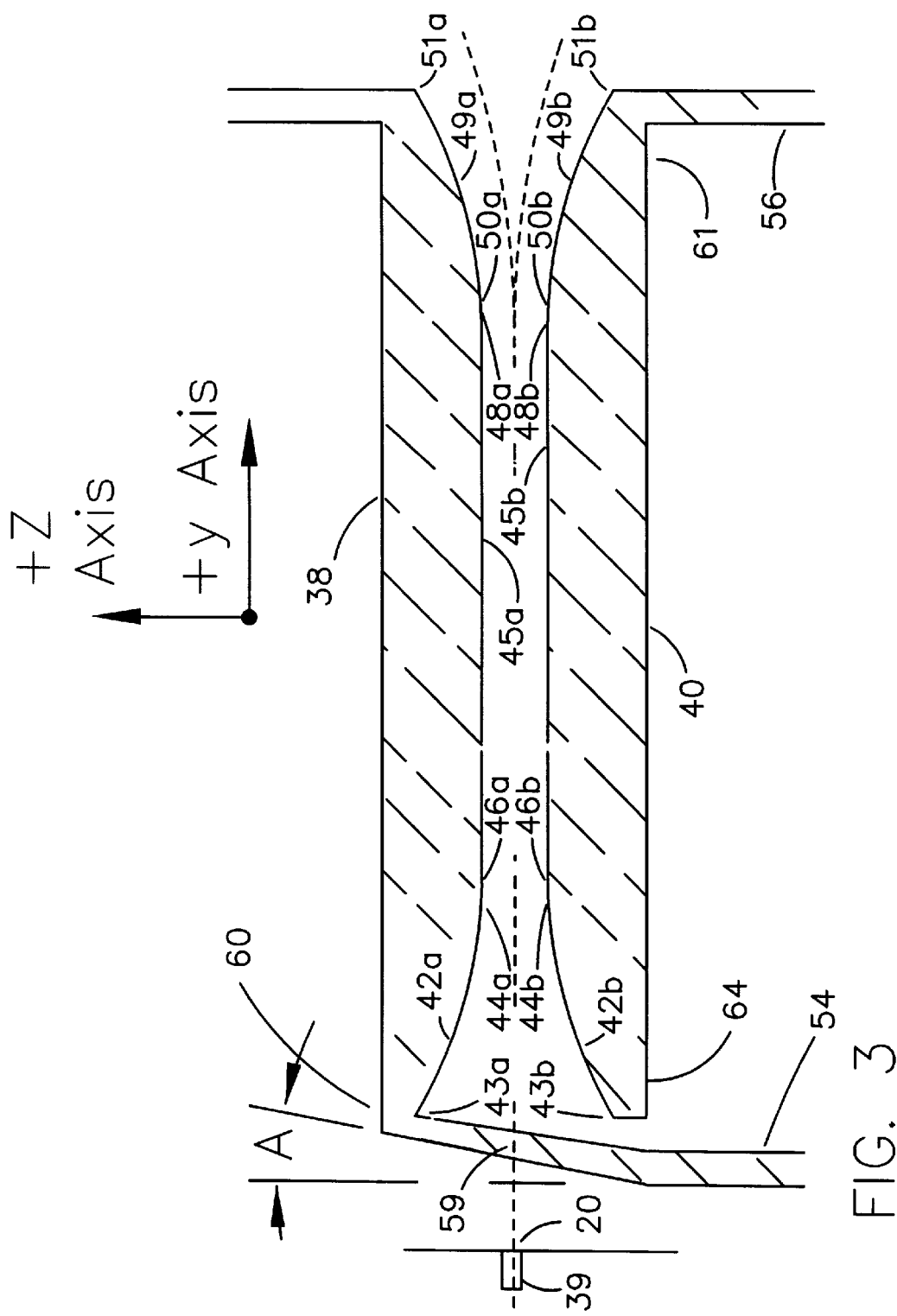
FIG. 3 is a schematic partial plan view of a portion of a MIOC showing the first and second rails, their segments, the conductive crossing segment and a portion of the first rail conductive segment and a portion of the second rail conductive segment.

FIG. 3 is a schematic plan view of the chip expanded to show that each of the rails 38, 40 has a respective tapered input segment 42a, 42b that has input end 43a, 43b an output end 44a, 44b; a respective parallel segment 45a, 45b having an input end 46a, 46b, an output end 48a, 48b; a respective tapered output segment 49a, 49b having an input end 50a, 50b and an output end 51a, 51b.

The rails 38, 40 are substantially of the same length by design. The separation between the edge of the rail and the edge of the waveguide must be maintained. The gap or separation is reduced as far as it is practical to do so and is limited only by present processing limitations such as the quality of the lithography, the deposition process and masks.

The present separation is estimated to be one to five microns on each side of the input waveguide 18. The input waveguide is estimated to have a width of from three to seven microns. The gap must not be too small or excessive waveguide losses will occur. The separation between the parallel segments is estimated to be typically 7–15 um. The width of the waveguides and the separation between parallel segments 45a, 45b will depend on the design wavelength of the waveguide.

An object of the invention is to provide shielding between the "Y" junction and the modulator plates 36a, 36b and 36c. The signal driving these plates is typically a switching wave form with an amplitude controlled to impose a predetermined phase modulation on the optical signals passing through the first and second output waveguides 26, 28. The electric field produced by the modulator drive signals is sufficient to produce amplitude modulation on the optical signals entering and leaving the initial entry point to the "Y" junction. Absent adequate shielding, the amplitude modulation produced at the "Y" junction by the electric field of the modulation drive signal on the same chip is sufficient to impose a substantial burden on the processing electronics that receives and processes the detected output signal of a FOG.

The signals passing through the "Y" junction are therefore shielded in the preferred embodiment of FIGS. 2 and 3 from the fields of the modulation drive signals by extending the output ends 51a, 51b of the tapered output segments 49a, 49b past the "Y" junction along the diverging waveguides 26, 32. The extension of the rails is carried past a point at which the waveguides are separated by a distance that exceeds five times the width of the input waveguide 18. The gap between each rail and its respective output waveguide 26, 32 is maintained at three to five microns to output ends 51a, 51b of the output segments 49a, 49b.

FIG. 3 shows that each respective tapered input segment 42a, 42b has an input end 43a, 43b proximate or close to the input port 20, i.e. toward the left end of FIG. 3, and separated from the input waveguide 18 by a distance orthogonal to the input waveguide sufficient to minimize loss or reflections. Separation "B" shown on FIG. 2 depicts the separation between the respective input ends of the tapered input segments from the input waveguide 18.

Referring to FIG. 3, output ends 44a, 44b lead to the input ends 46a, 46b of the parallel segment 45a, 45b. They are formed and positioned on the surface of the optics chip to adiabatically, or tangentially approach the input ends 46a, 46b of the parallel segment 45a, 45b straddling the input waveguide 18. The output end 44a, 44b of each respective tapered input segment 42a, 42b homogeneously merges tangentially with the input end 46a, 46b of the corresponding parallel segment 45a, 45b.

The term adiabatic is meant to convey the concept of defining the curve of the input and output segments of the rails to be so gradual when joining the parallel segment as to avoid disturbing the signal passing through the input waveguide as possible. It should be understood that the characterization of the tapered input and output segments in the Figures is an example only.

Referring again to FIG. 2, a conductive bridge 54 comprises a first rail conductive segment 54, a first bonding pad 55, a second rail conductive segment 56 and a second bonding pad 57. The first and second bonding pads 55, 57 are connected by conductive jumper bridge 58. A conductive crossing segment 59 is shown as a first portion of the first rail conductive segment 54.

FIG. 3 shows that the input end 43a, 43b of at least one input segment 42a, 42b is coupled to a first end of a conductive crossing segment 59. The conductive crossing segment 59 is very thin and is characterized to cross or traverse the input waveguide 18 at an angle "A" selected to cause minimum reflections or losses in signal passing through the input waveguide 18.

Referring again to FIG. 3, each respective tapered output segment 42a, 42b has an input end 50a, 50b coupled to the respective output end 48a, 48b of the respective parallel segment 45a, 45b. The tapered output segments 49a, 49b, curve away from the parallel segment 45a, 45b and the "Y" junction 24 in an adiabatic manner to avoid reflections and to diminish losses.

As shown in FIG. 2, the first rail 38 is connected to a first bonding pad 55 via a first rail conductive segment 54. The second rail 40 is connected to a second bonding pad 57 via a second rail conductive segment 56. A conductive jumper bridge 58 connects the first and second rails 38, 40 by connecting the first bonding pad 55 to the second bonding pad 57. The circuit formed by the first rail conductive segment 54, the second rail conductive segment 56, the first and second bonding pads 55, 57 and the conductive jumper bridge 58 form a conductive network which operates to prevent a charge differential from developing between the first and second rails 38, 40.

In the preferred embodiment, the rails, pads and conductive paths are formed of metal; however, it is possible that other conductive materials that might be placed with comparable precision might serve as well. The metal that forms a conducting layer for the rails, bridges and segments is typically deposited using vacuum evaporated or sputtered metal onto the surface with exposed regions delineated by using suitable photo-lithographic masks or mechanical masks. The metal for the rails is typically of the same type used for the modulator plates 36a–36c and pads 37a, 37b and 37c. A composite layer of first titanium and then gold is sometimes used. Other coatings that might be tried include resistivity sputtered palladium—gold and graphite paint.

Figure 4:
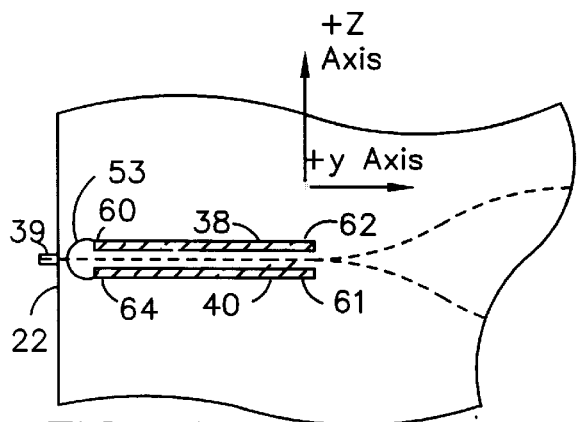
FIG. 4 is a schematic plan view of a portion of a MIOC showing the input wave guide and a pair of rails, the first end of the first rail is shown connected to the second end of the second rail by a conductive bridge shown as a flying lead.
Figure 5:
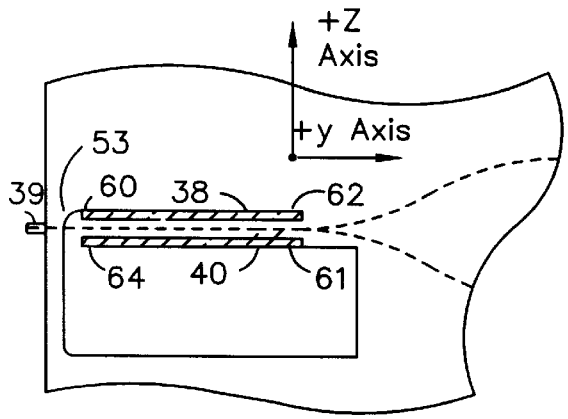
FIG. 5 is a schematic plan view of a portion of an MIOC showing the input wave guide and a pair of rails, the first end of the first rail is shown connected to the first end of the second rail by a conductive bridge.

FIG. 4 shows the input wave guide 18 and a pair of rails 38, 40. The first end 60 of the first rail 38 is shown connected to the first end 54 of the second rail 40 by a conductive bridge 53 depicted as a fly lead. The first and second rails 38, 40 each have a respective first end 60, 64 and a second end 62, 61. The first end 60 of the first rail 55 is proximate or closest to the input face 22. The first end 64 of the second rail 40 is proximate or closest to the input face 22. The topology of FIG. 5 shows an arrangement in which the conductive bridge 53 is connected between the first rail first end 60 and the second rail second end 61.

At present the conductive network comprising the first and second rails 38, 40 and the conductive bridge 53 connecting the first and second rails are floating. However, in another application, it may be advantageous to establish a conductive path (not shown) from the conductive network to a reference potential such as a system voltage, signal source, or ground to prevent the network from developing a charge and assuming an undefined potential.

FIGS. 1, 2 and 6–9 show embodiments in which the conductive bridge 53 is further characterized to include first and second bonding pads 55, 57 and a conductive jumper bridge 58 which is designed to be interrupted to permit an external drive circuit to drive the first and second rails to different potentials via external connections made to a first rail bonding pad 55 and to the second bonding pad 57.

The conductive jumper bridge 58 can be interrupted by use of chemical means, a laser or mechanically with a scribe after which electrical contact with the rails could be made using a ball bonded or acoustically bonded lead between the first and second bonding pads 55, 57 or a soldered lead between the first and second bonding pads 55, 57.

The circuit can also be restored via a small droplet of conductive epoxy or with a reflow of gold or equivalent material across the break in the conductive jumper bridge 58. If the first rail bonding pad 55 and the second rail bonding pad 57 were coupled to package pins, the conductive jumper bridge 58 could be external to the package and operated to a conductive or open state under system control.

FIG. 5 shows the first end 60 of the first rail 38 connected to the second rail second end 61 without bonding pads.

Figure 6:
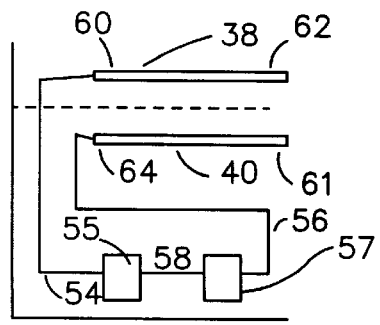
FIG. 6 is a schematic plan view of a portion of an MIOC showing the input wave guide and a pair of rails, the first end of the first rail being connected to a first pad. The second end of the second rail is connected to a second pad and the first and second pads are connected by a conductive jumper bridge.

FIG. 6 shows an arrangement in which the first rail conductive segment 54 is connected from the first rail 38 first end 60 is connected to the first bonding pad 55. The second rail 40 first end 64 is connected to the second bonding pad 57 via second rail conductive segment 56. The first and second bonding pads 55, 57 are connected to each other via the conductive jumper bridge 58.

Figure 7:
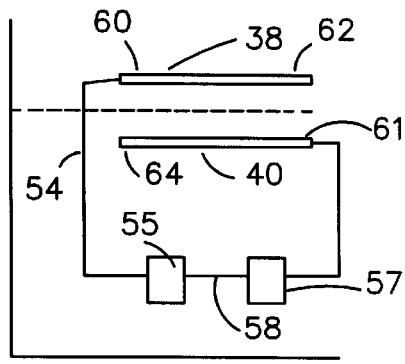
FIG. 7 is a schematic plan view of a portion of an MIOC showing the input wave guide and a pair of rails, the first end of the first rail being connected to a first pad. The first end of the second rail is connected to a second pad and the first and second pads are connected by a conductive jumper bridge.

FIG. 7 shows an arrangement in which the first rail 38 first end 60 is connected to the first bonding pad 55. The second rail 40 first end 61 is connected to the second bonding pad 57 The first and second bonding pads 55, 57 are connected to each other via the conductive jumper bridge 58.

Figure 8:
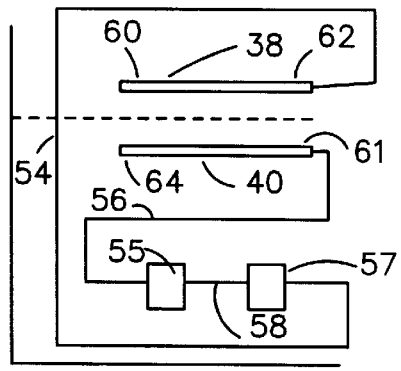
FIG. 8 is a schematic plan view of a portion of an MIOC showing the input wave guide and a pair of rails, the second end of the first rail is connected to a first pad. The first end of the second rail is connected to a second pad. The first and second pads are connected by a conductive jumper bridge.

FIG. 8. shows an embodiment in which the first rail 38 second end 62 is connected to the second bonding pad 57. The second rail 40 second end 61 is connected to the first bonding pad 55. The first and second bonding pads 55, 57 are connected to each other via the conductive jumper bridge 58.

Figure 9:
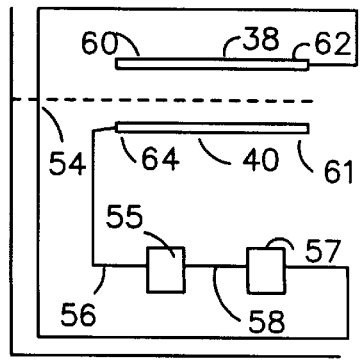
FIG. 9 is a schematic plan view of a portion of an MIOC showing the input wave guide and a pair of rails. The first end of the first rail is connected to a first pad. The second end of the second rail is connected to a second pad and the first and second pads are connected by a conductive jumper bridge.

FIG. 9. shows an embodiment in which the first rail 38 second end 62 is connected to the second bonding pad 57. The second rail first end 64 is connected to the first bonding pad 55. The first and second bonding pads 55, 57 are connected to each other via the conductive jumper bridge 58.

It is possible to envision alternative embodiments in which the function of interrupting the conductive bridge 53 can be achieved by the use of an inexpensive semiconductor switch such as a J-FET (a junction fet) or a N-Channel IGFET in die form positioned on pads on the surface of the MIOC to form the conductive bridge 53 with its conduction channel.

Cost will discourage such an approach while production quantities are low, but automation assembly might produce a trade off that favors the use of such an added component which would allow the part to be tested with open or shorted rails. A bias supply would have to be augmented to the gate of such a switch. Such a switch might also be located outside of the package.

The size of available dies might be a limitation on the use of such a means for interrupting and re-connecting the conductive jumper bridge. Alternative devices that might be investigated include the use of an optically coupled transistor or an E-PROM semiconductor switch.

An n-channel J-FET might be preferable since it would require a negative drive voltage on its gate only during test when it might be desired to turn off the device. An N-Channel IGFET would require a positive gate voltage to turn it on to short the first and second conduction pads together, however, no drive power would be consumed.

The process of manufacturing MIOC devices can be improved with the teaching of this patent to afford the maker with devices free of temperature driven hysteresis effects by adding the following steps to the method of forming an optic chip using conventional methods. The added steps will include the steps of:

1. Forming at least a first and a second rail on the top surface of the optical chip, the first and second rails being positioned to straddle a portion of the input waveguide.

2. Contemporaneous with or subsequent to step 1, forming a conductive bridge connecting the first and second rails to form a conductive network and to prevent a charge differential from developing between the first and second rails.

Although the invention has been disclosed and illustrated in detail, it is to be understood that the same is by way of illustration as an example only and is not to be taken by way of limitation. The spirit and scope of this invention is to be limited only by the terms of the appended claims.

What is claimed is:

1. An Integrated Optics Chip comprising:
    an optics chip having a top surface, a +Z face and a −Z face, the chip being formed from a crystal having a high electro-optic coefficient and conventional X, Y and Z crystal axes, and wherein, the orientation of the +Z axis and −Z axis are substantially orthogonal to the input waveguide, the Z axis being that axis across which a pyroelectric effect is exhibited;
    at least one input waveguide coupled to receive an optical signal from an input port, and to couple that signal to a waveguide network,
    at least a first and a second conductive rail, the rails being formed on the top surface of the optic chip, the first and second rails being positioned to straddle a portion of the input waveguide, each rail having;
        a respective tapered input segment having an input end and an output end,
        a respective parallel segment having an input end and an output end, the parallel segments of the respective first and second rails being positioned to be parallel to and to closely straddle a portion of the input waveguide,
        each respective tapered input segment having an input end proximate the input port and distanced from the input waveguide, the extent of the tapered input segment being formed and positioned on the surface of the optics chip to adiabatically approach the input waveguide as the respective output end of the tapered input segment homogeneously merges with the input end of the corresponding parallel segment;
        a conductive bridge connects the first and second rails to form a conductive network and to prevent a charge differential from developing between the first and second rails.

2. The Integrated Optics Chip of claim 1 wherein the first and second rails further comprise:

a respective tapered output segment having an input end and an output end, and a respective parallel segment having an input end and an output end, the output end of the parallel segment being adiabatically coupled to the input end of the tapered output segment, and the parallel segments of the respective first and second rails being positioned to be parallel to and to closely straddle a portion of the input waveguide, each respective tapered output segment being formed and positioned on the surface of the optics chip to adiabatically depart the input waveguide.

3. The Integrated Optics Chip of claim 2 wherein the input waveguide divides to form a "Y" junction by separating into first and second output waveguides, and wherein each respective tapered output segment being formed and positioned on the surface of the optics chip to adiabatically depart the input waveguide is extended in length to position the output ends of the tapered output segments past the "Y" junction along the first and second output waveguides past a point at which the output waveguides are separated by a distance that exceeds five times the width of the input waveguide, a gap between each rail and its respective output waveguide being maintained at three to five microns to output ends of the output segments.

4. The Integrated Optics Chip of claim 1 wherein the first and second conductive rails positioned on the top surface of the optic chip straddling a portion of the input waveguide are formed of metal and are of approximately equal length.

5. The Integrated Optics Chip of claim 1 wherein the first and second conductive rails positioned on the top surface of the optic chip straddling a portion of the input waveguide are formed on the top surface from metal, and wherein each respective rail further comprises;

a respective tapered input segment having an input end and an output end, a respective parallel segment having an input end and an output end, the parallel segments of the respective first and second rails being positioned to be parallel to and to closely straddle a portion of the input waveguide, each respective tapered input segment having an input end proximate to the input port and distanced from the input waveguide, the extent of the tapered input segment being formed and positioned on the surface of the optics chip to adiabatically approach the input waveguide as the respective output end of the tapered input segment homogeneously merges with the input end of the corresponding parallel segment, and wherein the input end of at least one input segment is coupled to a first end of a conductive crossing segment, the conductive crossing segment being characterized to traverse the input waveguide at an angle selected to induce minimum losses.

6. The Integrated Optics Chip of claim 1 wherein the optical chip further comprises:

a conductive path from the conductive network to a reference potential to prevent the network from developing a charge and assuming an undefined potential.

7. An Integrated Optics Chip comprising:

an optics chip having a top surface, a +Z face and a −Z face, the chip being formed from a crystal having a high electro-optic coefficient and conventional X, Y and Z crystal axes, and wherein, the orientation of the +Z axis and −Z axis are substantially orthogonal to the input waveguide, the Z axis being that axis across which a pyroelectric effect is exhibited;

at least one input waveguide coupled to receive an optical signal from an input port, and to couple that signal to a waveguide network, at least a first and a second conductive rail, the rails being formed on the top surface of the optic chip, the first and second rails being positioned to straddle a portion of the input waveguide, the rails being positioned to be parallel to and to closely straddle a portion of the input waveguide, a conductive bridge connecting the first and second rails to form a conductive network and to prevent a charge differential from developing between the first and second rails; the conductive bridge having a conductive crossing segment, the conductive crossing segment being characterized to traverse the input waveguide at an angle selected to induce minimum losses.

8. An Integrated Optics Chip comprising:

an optics chip having a top surface, a +Z face and a −Z face, the chip being formed from a crystal having a high electro-optic coefficient and conventional X, Y and a Z crystal axes, an input waveguide coupled to receive an optical signal from an input port, and to couple that signal to a waveguide network, at least a first and a second rail, the rails being formed on the top surface of the optic chip, the first and second rails being positioned to closely straddle a portion of the input waveguide, a conductive bridge formed on the top surface of the chip connecting the first and second rails to form a conductive network and to prevent a charge differential from developing between the first and second rails, the conductive network having a conductive crossing segment formed to cross the input waveguide at an angle selected to produce minimum losses and reflections.

9. The Integrated Optics chip of claim 8 wherein:

the first and second rails each have a respective first end and a second end, the first end of the first rail being proximate to the input face, the first end of the second rail being proximate to the input face, the conductive bridge being connected between the first rail first end and the second rail first end.

10. The Integrated Optics Chip of claim 8 wherein:

the first and second rails each have a first end and a second end, the first end of the first rail being proximate to the input face, the first end of the second rail being proximate to the input face, the conductive bridge being connected between the first rail first end and the second rail second end.

11. The Integrated Optics Chip of claim 8 wherein:

the first and second rails each have a respective first end and a second end, the first end of the first rail being proximate to the input face, the first end of the second rail being proximate to the input face, and wherein the conductive bridge further comprises:

a first bonding pad, and a second bonding pad, the first rail first end being connected to the first bonding pad, the second rail first end being connected to the second bonding pad, the first and second bonding pads being connected to each other via a conductive jumper bridge.

12. The Integrated Optics Chip of claim 8 wherein:

the first and second rails each have a first end and a second end, the first end of the first rail being proximate to the input face, the first end of the second rail being proximate to the input face, and wherein the conductive bridge further comprises:
a first bonding pad, and
a second bonding pad,
the first rail first end being connected to the first bonding pad, the second rail second end being connected to the second bonding pad, the first and second bonding pads being connected to each other via a conductive jumper bridge.

13. The Integrated Optics Chip of claim 8 wherein:

the first and second rails each have a respective first end and a second end, the first end of the first rail being proximate to the input face, the first end of the second rail being proximate to the input face, and wherein the conductive bridge further comprises:
a first bonding pad, and
a second bonding pad,
the first rail second end being connected to the second bonding pad, the second rail second end being connected to the first bonding pad, the first and second bonding pads being connected to each other via a conductive jumper bridge.

14. The Integrated Optics Chip of claim 8 wherein:

the first and second rails each have a respective first end and a second end, the first end of the first rail being proximate to the input face, the first end of the second rail being proximate to the input face, and wherein the conductive bridge further comprises:
a first bonding pad, and
a second bonding pad,
the first rail second end being connected to the second bonding pad, the second rail first end being connected to the first bonding pad, the first and second bonding pads being connected to each other via a conductive jumper bridge.

15. The Integrated Optics Chip of claim 8 wherein the conductive bridge further comprises:

a first bonding pad, and
a second bonding pad,
the first and second bonding pads being connected to each other via
a semiconductor switch, the semiconductor switch having
a first terminal connected to the first bonding pad and a second terminal connected to the second bonding pad, the semiconductor switch having a conduction channel connecting the first and second terminals, the semiconductor switch also having
a control grid for driving the conduction channel into a conductive state in response to a first potential being applied to the control grid with respect to a reference potential and into a non-conductive state in response to a second potential being applied to the control grid with respect to a reference potential.

16. The Integrated Optics Chip of claim 15 wherein the semiconductor switch is selected from a group comprising an N-Channel Field Effect Transistor, an N-Channel Junction Transistor, and an optically coupled transistor or an E-PROM semiconductor switch.

17. The Integrated Optics Chip of claim 8 wherein the conductive bridge further comprises:

a first bonding pad, and
a second bonding pad,
the first and second bonding pads being connected to each other via a conductive jumper bridge and wherein the conductive jumper bridge is first open circuited and is restored to a conductive jumper bridge by use of a conductor to be selected from a group comprising: a jumper, a resistor, a dab of conductive epoxy or other conductive means for connecting the first bonding pad to the second bonding pad.

18. The Integrated Optics Chip of claim 8 wherein the conductive bridge further comprises:

a first bonding pad, and
a second bonding pad,
the first and second bonding pads being connected to each other via a conductive jumper bridge, and wherein:
the conductive jumper bridge is a trace of conductive material positioned and designed to have a region suitable for mechanical severing for test, and a remainder of accessible length being close for convenient restoration and re-connection.

19. An Integrated Optics Chip of claim 8 wherein the first and second rails each have a respective first end and a second end, the first end of the first rail being proximate to the input face, the first end of the second rail being proximate to the input face, and wherein
the conductive bridge further comprises:
a first bonding pad, and
a second bonding pad,
the first rail first end being connected to the first bonding pad, the second rail first end being connected to the second bonding pad, the first and second bonding pads being connected to each other via a conductive jumper bridge,
and wherein at least one of the first or second bonding pads is positioned at the edge of the top surface or is conductively coupled to a third bonding pad at the edge of the top surface to facilitate an electrical connection to a conductive coating on the +Z or −Z face.

20. A method for producing an optics chip having a top surface orthogonal to a +Z face, a −Z face, the chip being formed from a crystal having a high electro-optic coefficient and having, at least one input face having at least one waveguide input port, comprising the steps of forming an optic chip using conventional methods including the steps of:

forming at least a first and a second rail on the top surface of the optical chip, the first and second rails being positioned to straddle a portion of an input waveguide formed on the top surface, and contemporaneously or subsequently forming a conductive bridge connecting the first and second rails to form a conductive network and to prevent a charge differential from developing between the first and second rails, the conductive bridge having a conductive crossing segment characterized to traverse the input waveguide at an angle selected to induce minimum losses.

* * * * *